US008681742B2

(12) United States Patent
Sun et al.

(10) Patent No.: US 8,681,742 B2
(45) Date of Patent: *Mar. 25, 2014

(54) MAC AND TCP COORDINATION APPROACH FOR PERFORMANCE IMPROVEMENT IN IEEE 802.16E MOBILE BROADBAND ACCESS SYSTEMS

(75) Inventors: Guobin Sun, Beijing (CN); Hongfei Zhu, Beijing (CN); Yanling Yao, Beijing (CN)

(73) Assignee: STMicroelectronics (Beijing) R&D Co., Ltd., Beijing (CN)

( * ) Notice: Subject to any disclaimer, the term of this patent is extended or adjusted under 35 U.S.C. 154(b) by 323 days.

This patent is subject to a terminal disclaimer.

(21) Appl. No.: 13/167,228

(22) Filed: Jun. 23, 2011

(65) Prior Publication Data

US 2011/0249559 A1  Oct. 13, 2011

Related U.S. Application Data

(63) Continuation of application No. 12/046,246, filed on Mar. 11, 2008, now Pat. No. 7,969,946.

(30) Foreign Application Priority Data

Mar. 16, 2007  (CN) .............................. 2007 1 088620

(51) Int. Cl.
*H04W 4/00* (2009.01)
*H04J 3/16* (2006.01)
*H04W 36/00* (2009.01)

(52) U.S. Cl.
USPC ............................ 370/331; 370/469; 370/437

(58) Field of Classification Search
None
See application file for complete search history.

(56) References Cited

U.S. PATENT DOCUMENTS

| | | | |
|---|---|---|---|
| 6,876,639 B1 * | 4/2005 | Cao | 370/331 |
| 2005/0176473 A1 * | 8/2005 | Melpignano | 455/574 |
| 2007/0240209 A1 | 10/2007 | Lewis et al. | |

OTHER PUBLICATIONS

Atiquzzaman, et al.: "TraSH-SN: A Transport Layer Seamless Handoff Scheme for Space Networks," Fourth Annual Earth Science Technology Conference (ESTC), Jun. 22-24, 2004, Palo Alto, CA (pp. 1-9).
Bai, et al.: "Transport Layer Design in Mobile Wireless Networks," Design and Analysis of Wireless Networks, 2005 Nova Science Publishers, Inc. (pp. 291-308).

(Continued)

*Primary Examiner* — Yemane Mesfin
*Assistant Examiner* — Samina Choudhry
(74) *Attorney, Agent, or Firm* — Gardere Wynne Sewell LLP

(57) ABSTRACT

A mobile device includes a communications protocol stack including a MAC layer and TCP layer separated by an IP layer. A cross-layer coordination module parallel to the communications protocol stack is coupled to both the MAC layer and TCP layer. The MAC layer generates a message sent to the cross-layer coordination module indicating that the mobile device is about to engage in a communications handover from a first base station to a second base station. The cross-layer coordination module passes handover information to the TCP layer so as to inform the TCP layer of the communications handover. If the mobile device is operating as a TCP sender, the TCP layer freezes its connection and state during the communications handover. If the mobile device is operating as a TCP receiver, the TCP layer sends a TCP ACK message to a TCP sender having an advertised window size set to a zero value so as to cause the TCP sender to freeze a connection and state during communications handover.

32 Claims, 2 Drawing Sheets

(56) References Cited

OTHER PUBLICATIONS

Balakrishnan, et al.: "Improving Reliable Transport and Handoff Performance in Cellular Wireless Networks(1)," ACM Wireless Networks Journal (WINET), 1(4), Dec. 1995 (pp. 1-19).
Cho, et al.: "TCP Performance Improvement with ACK Pacing in Wireless Data Networks," School of Electrical Engineering and Computer Science, Seoul National University, Seoul, KR (10 pages).
Chowdhury, et al.: "Design Issues for Mobility Management Schemes in Data Networks," Telecommunication and Networks Research Lab, School of Computer Science, University of Oklahoma (9 pages).
Dacosta: "Freeze TCP With Timestamps for Fast Packet Loss Recovery After Disconnections," University of Canterbury (8 pages).
Fu, et al.: "Signaling Cost and Performance of SIGMA: A seamless handover scheme for data networks," Wireless Communications and Mobile Computing 2005 (pp. 825-845).
Goff, et al.: "Freeze-TCP: A True End-to-End TCP Enhancement Mechanism for Mobile Environments," Electrical Engineering Department, State University of New York (pp. 1-10).
Goff, et al.: "Freeze-TCP: A True End-to-End TCP Enhancement Mechanism for Mobile Environments," Electrical Engineering Department, State University of New York, IEEE INFOCOM 2000 (pp. 1537-1545).
Goff, et al.: "Freeze-TCP: A True End-to-End TCP Enhancement Mechanism for Mobile Environments," INFOCOM 2000, Postech DP&NM Lab, Lee Hyo Jin powerpoint slides (pp. 1-28).
Gou, et al.: "A Receiver-Based Vertical Handover Mechanism for TCP Congestion Control," IEEE Transactions on Wireless Communications, vol. 5, No. 10, Oct. 2006 (pp. 2824-2833).
Kelly, et al.: "A Modified SCTP Handover Scheme for Real Time Traffic," Performance Engineering Laboratory, School of Electronic Engineering, Dublin City University, Ireland (pp. 3/1 through 3/8).
Mansour, et al.: "Performance Evaluation for Mobility Management Protocols in Cellular IP and Hawaii Mobile Networks," Department of Computing, University of Bradford, UK (pp. 1-9).
Rahman, et al.: "Network Friendliness of Mobility Management Protocols," Telecommunications and Networks Research Lab, School of Computer Science, University of Oklahoma (6 pages).
Rhee, et al.: "MTCP: Scalable TCP-like Congestion Control for Reliable Multicast," Department of Computer Science, North Carolina State University, Raleigh, NC (pp. 1265-1273).
Wang, et al.: "A Mobile IPv6 Based Seamless Handoff Strategy for Integrated UMTS-WLAN Networks," Department of Computer Science and Information Engineering, Tam Kang University, Taipei, TW (pp. 7-16).
First Office Action from co-pending application CN200710088620.5 mailed Jul. 9, 2010 (19 pages).
Mobile Communications, Jochen Schiller, 2nd version, published Dec. 31, 2003, p. 363.
Second Office Action from co-pending application CN200710088620.5 mailed Feb. 9, 2011 (20 pages).

\* cited by examiner

MAC AND TCP COORDINATION APPROACH FOR PERFORMANCE IMPROVEMENT IN IEEE 802.16E MOBILE BROADBAND ACCESS SYSTEMS

PRIORITY CLAIM

This application is a continuation of U.S. application for patent Ser. No. 12/046,246 filed Mar. 11, 2008, now U.S. Pat. No. 7,969,946, which is a translation of and claims the benefit of Chinese Application for Patent No. 20071088620, of the same title, filed Mar. 16, 2007, the disclosures of which are hereby incorporated by reference.

BACKGROUND OF THE INVENTION

1. Technical Field of the Invention

The present invention relates generally to mobile Broadband Wireless Access (BWA) communications systems. The invention more particularly relates to a MAC and TCP coordination approach in mobile BWA communications systems which improves TCP performance in the mobile environment where temporary link disconnections caused by handover (HO) are frequent and unpredictable.

2. Description of Related Art

The Transport Control Protocol (TCP) has not proven to be efficient in mobile wireless networks where temporary disconnections caused by handover (HO) may unpredictably occur. There is a need for an optimized TCP for the mobile environment in association with the incorporation of a mobility function in an IEEE 802.16e network. Significant research efforts have been made to propose enhancements to TCP performance in mobile conditions. However, these proposals suffer from numerous drawbacks. For example, the proposals may require unacceptable changes to the existing communications infrastructure. Additionally, the proposals often ignore the common scenario that the mobile station may act as both a TCP sender and a TCP receiver.

An acceptable solution to the issues surrounding the use of TCP in a mobile environment must recognize that the mobile station may act as both a TCP sender and a TCP receiver. Additionally, a solution to the problem must minimize changes to the infrastructure and more preferably restrict changes to only the mobile station while using existing TCP protocol at the remote sender or receiver.

BWA is emerging as an integral part of the next generation (4G) wireless access infrastructure. BWA targets providing high-speed wireless access to data networks. This allows users to stay connected to the Internet, to use a variety applications, and to access digital media simply by using wireless handheld devices connected through omnipresent access portals (APs). One particular BWA technology is being standardized through the IEEE 802.16 standard to offer high data rate wireless "first-mile/last-mile" broadband access in a Metropolitan Area Network (MAN). At present, the IEEE 802.16 standard family consists of four amendments or updates: 802.16, 802.16a, 802.16d (802.16-2004[1]), and 802.16e (802.16-2005[2]). To take advantage of the inherent mobility of wireless media in BWA systems, the recently released 802.16e specification defines the mobility operations in the 2-6 GHz licensed bands and promises to support mobility at mobile station speeds of up to 70-80 mph.

IEEE 802.16e is a standard for BWA that supports intra-domain mobility. This standard may fill the gap between fixed wireless, local area networks and mobile cellular systems. To enable users to make use of a wide-area network through an access network when mobile, the IEEE 802.16e standard defines the handover (HO) process in which a Mobile Station (MS) migrates from the air-interface provided by one Base Station (BS) to the air-interface provided by another BS.

The Medium Access Control (MAC) layer of the protocol stack has a HO process that comprises two main stages: the first stage is the HO pre-registration phase and the second stage is the real HO phase. During the HO pre-registration phase, the target BS is selected and pre-registered with the MS. However, the connection to the currently serving BS is maintained during the pre-registration phase and packets continue to be exchanged with the currently serving BS. In the real HO phase, the MS releases the currently serving BS and re-connects with the target BS. Packet exchange then proceeds with respect to the target/newly serving BS.

According to the IEEE 802.16e standard, either the MS or the currently serving BS may initiate the HO pre-registration phase. After an MS or a currently serving BS initiates the HO pre-registration phase, the currently serving BS may negotiate the intention to perform a HO with its neighboring BSs (through exchanged backbone communications). These negotiations concern whether each of the neighboring BSs possesses the capability to serve the MS. The currently serving BS may further notify the selected neighboring BS of the impending HO.

FIG. 1 shows an example of MAC layer HO process initiated by the MS. The MS engages in a process to scan neighboring BSs for better communication than with the currently serving BS and may make a decision that a HO is needed. A HO request (MOB_MSHO-REQ message) is then sent from the MS to the currently serving BS (where the request may recommend one or more candidate target BSs). The currently serving BS (in this case BS#1) then sends an HO-notification message to each of the candidate target BSs (for example, BS#2 and BS#3). This message includes an identification of the MS and information concerning the communication service to be provided (BW, QoS, connection parameters). Each notified target BS evaluates whether service can be provided and responds with an HO-notification-response message which includes an acknowledge (ACK) or not acknowledge (NACK) indication with respect to accepting a possible HO of the MS. More specifically, the target BS indicates whether it can (or cannot) participate in the HO and service the MS. This message may further qualify an acknowledgement concerning a class of QoS that the target BS can support. After that, the serving BS selects one or more of the target BSs as being acceptable for the HO, and sends a handover response (HO-RSP) message to the MS. This message includes an identification of each acceptable target BSs. The MS then makes a target BS selection from the acceptable list and transmits an HO-IND message to the serving BS. This message identifies which of the BSs on the acceptable list has been selected by the MS for the HO. This message further provides the serving BS with a final indication that it is about to perform a real HO. The serving BS then releases communication with the MS, and the MS synchronizes with the selected target BS in a manner well known in the art (see, Fast_Ranging_IE, RNG_REQ and RNG_RSQ). After re-authorization and re-registration are completed with respect to the selected target BS (see, complete initial network entry after HO), the communication service flows with the MS can be re-established through the newly serving BS.

Since the IEEE 802.16 standard for BWA is expected to be an attractive alternative to the use of traditional wireline services through cable modem, xDSL and/or T1/E1, the users of this potential wireless system will require transparency with respect to the distinct link characters of the wireless communication while still being able to use the same applications as they do in wired networks. This means that the dominant transport protocol in a wired network, TCP, remains a vital component of the transport layer in the IEEE 802.16 network.

However, with the introduction of mobility in the IEEE 802.16e standard, a MS handover in the MAC layer may lead to temporary disconnection and packet loss in the TCP layer. Because the TCP protocol was originally developed for the wired networks, the TCP protocol has no idea about the possibility or implementation of HO in the MAC layer. Once packet loss occurs due to HO, the TCP layer mistakenly concludes that the network is congested and immediately initiates the known TCP congestion control algorithm. Hence, during the temporary disconnections caused by the HO of a MS, the TCP layer reduces its congestion window to a minimum value. After the link is reconnected following the completion of HO, the TCP layer then invokes the slow-start algorithm. This is a relatively slow process in the TCP layer during which the congestion window returns to its previous value (i.e., before the HO). Therefore, a period of time may be wasted with respect to communications after the MS reconnects with the target BS following HO. As a result, the temporary disconnections caused by HO of the MS degrade TCP throughput and radio resource utilization.

Known attempts to address some of the problems noted above include solutions proposed by: (1) Rhee, et al., "MTCP: Scalable TCP-like congestion control for reliable multicast," Proc. IEEE INFOCOM, 1999, pp. 1265-1273; (2) Balakrishnan, et al., "Improving reliable transport and handoff performance in cellular wireless networks," ACM Wireless Networks, pp. 469-481, December 1995; and (3) Goff, et al., "Freeze-TCP: A true end-to-end TCP enhancement mechanism for mobile environments," Proc. IEEE INFOCOM, 2000, pp. 1537-1545. These solutions specify two classes of TCP optimization approaches in order to improve TCP performance in a mobile environment: the first is TCP optimization based on intermediary (such as BS) assistance, such as described in the Rhee and Balakrishnan references; and the second is end-to-end TCP optimization without the involvement of any intermediaries such as Freeze-TCP as described in the Goff reference.

The first class of solution resides on an intermediate host (such as the base station). It requires the intermediate host to cache packets from the sender and to inspect their TCP headers. Using information snooped from the communications, if the intermediate host determines that a packet has been lost, it retransmits a buffered copy to the mobile node (which is intended to be a local retransmission over one or multiple links). In this process, the intermediate host maintains its own timers for retransmissions of buffered packets, implements selective retransmissions, etc.

The second class of solution does not involve any intermediaries in flow control. Instead, it is an end-to-end scheme applying only to the circumstance where the MS is a TCP receiver. The main idea is to move the onus on signaling an impending disconnection to the client. A mobile node can certainly monitor signal strengths in the wireless antennas and detect the need for an impending HO. In certain cases, the mobile node might even be able to predict a temporary disconnection (if the signal strength is fading, for instance). In such a case, the mobile node can specify a zero window size and thus force the sender TCP into the Zero Window Probes (ZWP) mode which would prevent it from dropping its congestion window as a result of lost packets due to the handover.

As described above, the available TCP optimization approaches attempt to improve TCP performance during the HO process within the TCP layer. However, these solutions have some weaknesses. The first class of solution requires the BS to monitor the TCP traffic and assist in performance enhancement. Thus, this solution demands modification at both the BS and the MS. The BS should parse all the packets routed through it and then decide whether it is a TCP packet. This solution is not compatible with the existing infrastructure of the IEEE 802.16e standard. Even further, if the IP payload is encrypted, then this approach cannot work.

The second class of solution focuses on performance enhancement in the case where a MS acts as a TCP receiver. This solution ignores the common scenario that a MS may also act as a TCP sender due to the high data rate offered by the BWA system.

A need accordingly exists in the art for a better solution which would minimize the adverse impact of a HO on TCP performance, while being easy to implement and administer.

SUMMARY OF THE INVENTION

Embodiments of the present invention propose a cross-layer interaction approach based on a MAC-TCP coordination model. This approach improves TCP end-to-end throughput in an IEEE 802.16e network. The solution combines MAC layer HO and TCP layer congestion control so as to minimize the adverse impact of HO on TCP performance in a way that is easy to implement and administer.

In an embodiment, a mobile device comprises a TCP sender including a communications protocol stack, said communications protocol stack including a MAC layer and a TCP layer. The MAC layer is configured to send a first message to the TCP layer of said communications protocol stack when the mobile device is about to engage in a communications handover from a first base station to a second base station, and is further configured to send a second message to said TCP layer of the communications protocol stack when the mobile device has completed communications handover from the first base station to the second base station. The TCP layer is configured to freeze a connection and state of the TCP layer in response to receipt of the first message from the MAC layer, and is further configured to terminate the freezing of the connection and state of the TCP layer in response to receipt of the second message from the MAC layer.

In another embodiment, a mobile device comprises a TCP transceiver including a communications protocol stack, said communications protocol stack including a MAC layer and a TCP layer; a cross-layer coordination module coupled between the MAC layer and TCP layer. The MAC layer is configured to send a message to the cross-layer coordination module when the mobile device is about to engage in a communications handover from a first base station to a second base station. The cross-layer coordination module is configured pass the message sent by the MAC layer to the TCP layer so as to inform the TCP layer of the communications handover from the first base station to the second base station.

In yet another embodiment, a mobile device comprises a TCP receiver including a communications protocol stack, said communications protocol stack including a MAC layer and a TCP layer. The MAC layer is configured to send a first message to the TCP layer of the communications protocol stack when the mobile device is about to engage in a communications handover from a first base station to a second base station, and is further configured to send a second message to said TCP layer of the communications protocol stack when the mobile device has completed communications handover from the first base station to the second base station. The TCP layer is configured send a first TCP ACK message with an advertised window size set to a zero value in response to receipt of the first message, and is further configured to send a second TCP ACK message with an advertised window size set to a non-zero value in response to the second message.

In another embodiment, a mobile device comprises a TCP sender including a communications protocol stack, said communications protocol stack including a MAC layer and a TCP layer. The TCP layer responds to receipt of a first TCP acknowledge message sent by a TCP receiver, said TCP acknowledge message having an advertised window size set to a zero value, by freezing a connection and state for a duration of a communications handover from a first base station to a second base station the TCP sender of a connection and state in response to the first TCP ACK message. The TCP layer responds to receipt of a second TCP ACK message sent by said TCP receiver, said TCP acknowledge message having an advertised window size set to a non-zero value, by terminating the freezing of the connection and state.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

The present invention concerns a MAC and TCP coordination approach that alleviates the throughput degradation effect of cellular HO in an IEEE 802.16e mobile BWA system.

As discussed above, the TCP layer experiences deterioration if it is shielded from knowledge of a HO scenario. To address this poor interaction between the TCP congestion control and the MAC layer HO, it is proposed to introduce the principle of cross-layer design such that the information available at one layer can be used for another layer. In this way, each protocol has information and can decide how to best cope with the communication scenario.

In an IEEE 802.16e system, the HO procedure is fully controlled by the MAC layer. The present solution suggests that the MAC layer communicate HO events with the TCP layer so that the TCP layer can apply the best solution. For example, when the TCP layer receives an explicit notification of a HO from the MAC, it can employ certain optimizations described herein.

Figure 1:
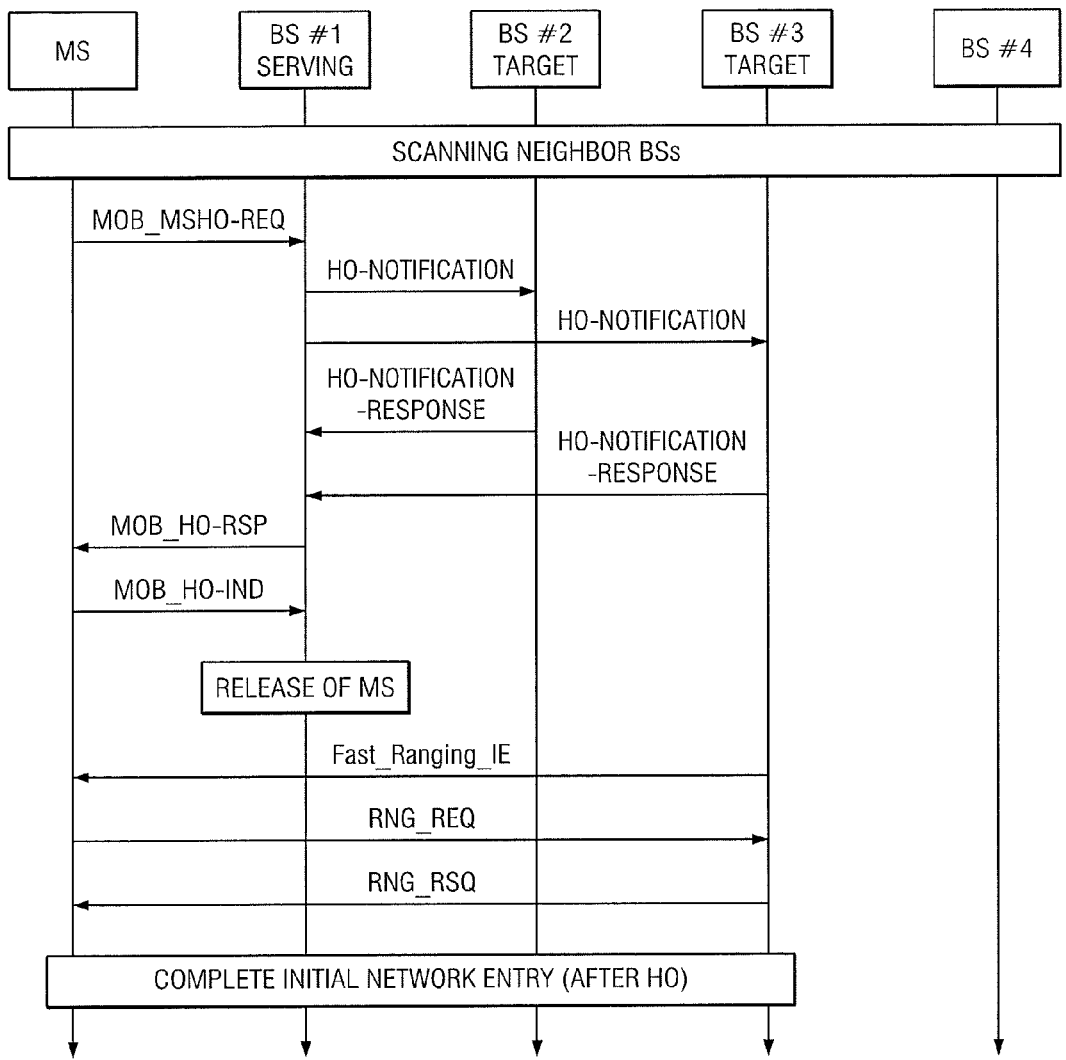
FIG. 1 is a signal flow diagram illustrating a MAC layer handover process initiated by a MS in accordance with the prior art.
Figure 2:
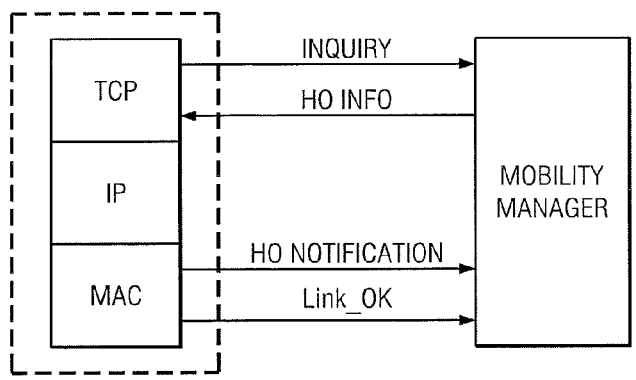
FIG. 2 is a block diagram of a MAC-TCP interlayer coordination model used in accordance with an embodiment of the present invention.

Reference is now made to FIG. 2 wherein there is shown a block diagram of a MAC-TCP interlayer coordination model used in accordance with an embodiment of the present invention. A new mobility management module (mobility manager) is introduced in parallel with the traditional communications protocol stack of TCP, IP and MAC. As shown in FIG. 2, the mobility management module acts as a parallel layer exchanging information with the MAC layer and the TCP layer. Using this cross-layer coordination model, the MAC layer periodically notifies the mobility management module as to its mobility status. The TCP layer, on the other hand, contacts the mobility management module to request and obtain HO information. Based on the HO information gathered from the MAC layer, the TCP layer decides on what it considers to be the best action to take at that instance.

The MAC layer can share its knowledge about the impending HO with the mobility management module. When the MS intends to release currently serving BS, the MS sends an HO_NOTIFICATION message to the mobility management module. The mobility management module then knows that the existing link will be disconnected because of an impending HO. In this case, it is recognized that packet loss may occur and steps can be taken at the TCP layer in response to information collected by the mobility management module to prevent packet loss during HO. Then, when the MS is reconnected with newly serving BS after HO, the MAC layer sends a LINK_OK notification to the mobility management module. Steps can then be taken at the TCP layer in response to information collected by the mobility management module to restore full communications service.

In the case where the MS acts as a TCP sender, the TCP layer inquires of the mobility management module in the case of a timeout. When the TCP layer receives definite HO information from the mobility management module, the TCP layer freezes its connection and state for the duration of the HO. The freezing of a TCP connection consists of, for example, temporarily blocking the sending application and freezing the round-trip time (RTT) timers as if the TCP clock had been stopped. The freezing of the RTT timers means that the TCP layer does not reduce its congestion window and does not back off its retransmission timer.

In this way, after the HO is completed, the TCP layer can resume with the same congestion window value as it had before the HO disconnection. As a result, the TCP connection can resume much faster after the HO takes place, and thus throughput degradation can be avoided.

For the case where the MS acts as a TCP receiver, an end-to-end signaling mechanism is used which integrates the method as disclosed in the Goff, et al. reference discussed above with the cross-layer coordination model. This solution requires changes only on the receiver side (mobile station) and continues to use the existing TCP protocol at the remote sender. In this case, the TCP layer inquires of the mobility management module in case of preparing to send a TCP ACK message. When the TCP layer receives definite HO information from the mobility management module, the TCP layer sets the "advertised window size" to be filled with a zero value in the TCP ACK message. This forces the TCP sender, upon receipt of the TCP ACK message, into a freeze state and prevents the sender's congestion window from dropping. When the TCP layer receives link reconnection information from the mobility management module, it sets the "advertised window size" to a non-zero value (i.e., an actual value useful for supporting communication) in order to restore the TCP sender back to its normal communication state. Thus, when the connection is re-established after HO, and since there is no change on the TCP sender's congestion window, TCP throughput may increase to the same extent as before HO occurred.

In summary, the proposed solution is a cross-layer design that employs HO notification from the MAC layer through a mobility management module in parallel with the protocol stack to force the TCP layer of the sender into a freeze state during the disconnection period caused by a HO of the MS from one BS to another BS.

Figure 3:
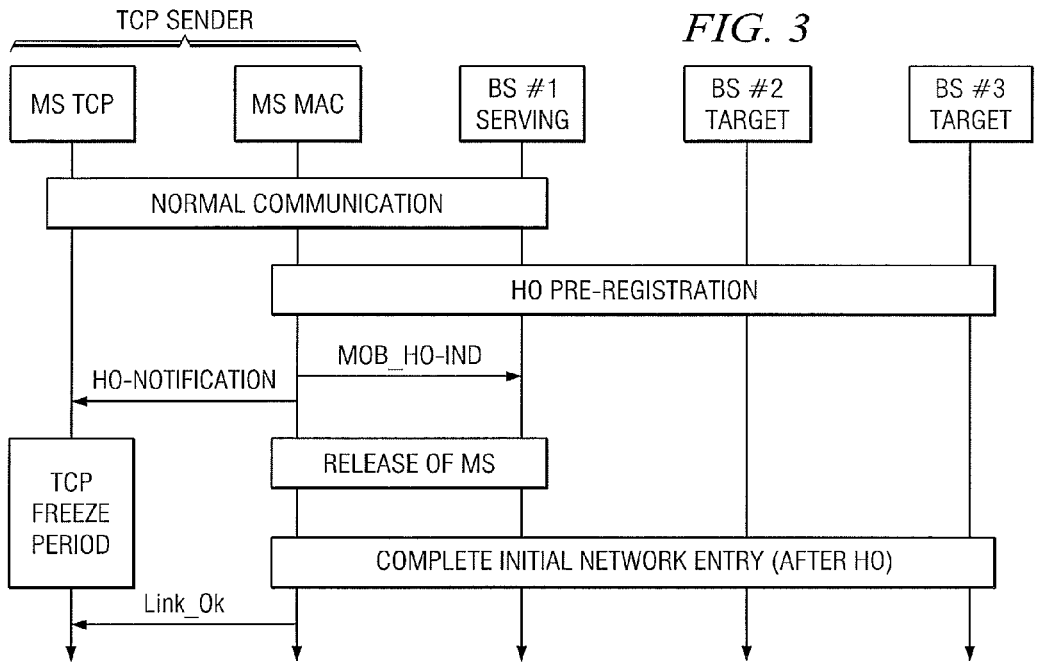
FIG. 3 is a detailed flowchart illustrating steps for a MAC and TCP coordination process in BS and MS in accordance with an embodiment of the present invention.

Reference is now made to FIG. 3 wherein there is shown a detailed flowchart illustrating steps for a MAC and TCP coordination process in the BS and MS in accordance with an embodiment of the present invention. Normal communication occurs between the MS and the currently serving BS (in this case BS#1). The MS then enters into the HO pre-registration phase as discussed above and a determination is made that a HO is needed. The MS then issues the MOB HO-IND message to the serving BS. To this point, operation is in accordance with the known prior art.

As shown in FIG. 3, prior to the serving BS releasing the MS, the MAC layer of the MS sends the definite HO indication message to the mobility management module and the information concerning the HO is passed on to the TCP layer of the MS (for example, at the request of the TCP layer). The TCP layer responds to the indication of a HO by freezing its state (with respect to the TCP sender). The TCP layer then waits, in the freeze period, for the HO to be completed. When the MAC layer of the MS completes initial network entry after HO with respect to the newly serving BS (in this case BS#3), the LINK_OK notification is sent to the mobility management module. Now that reconnection at the MAC layer has been accomplished following HO, the completion of the HO is communicated in the HO information from the mobility management module to the TCP layer of the MS. Responsive thereto, the TCP layer terminates the TCP freeze period.

Figure 4:
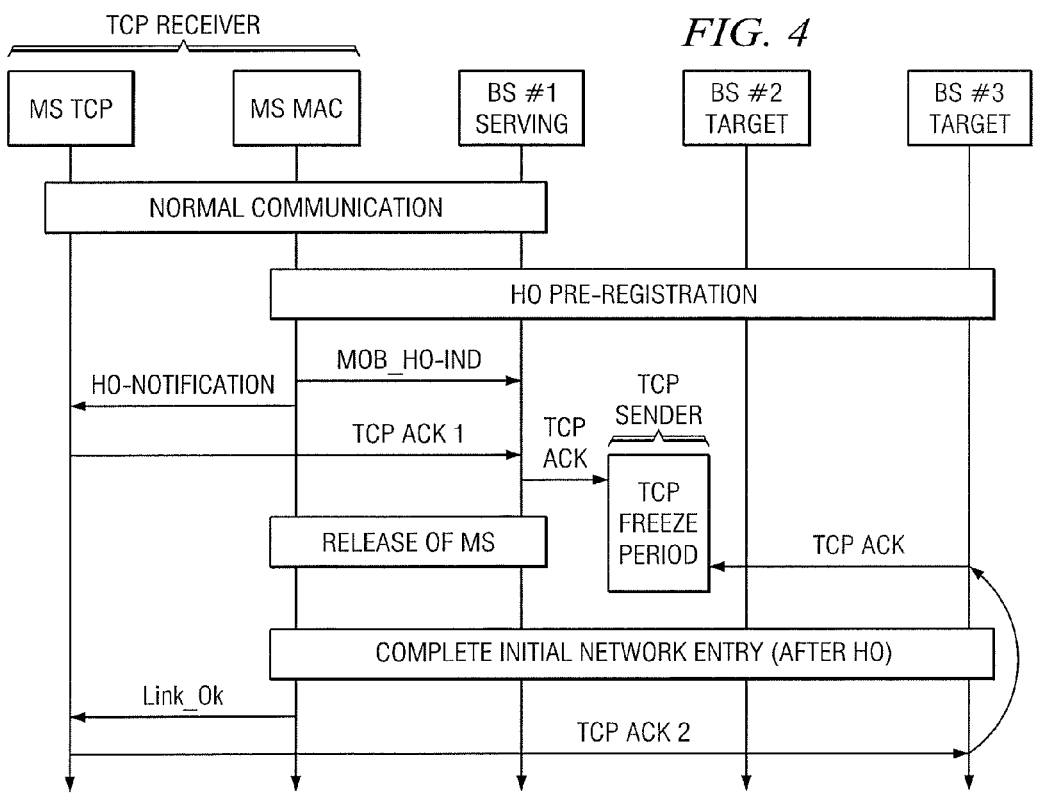
FIG. 4 is a detailed flowchart illustrating steps for a MAC and TCP coordination process in BS and MS in accordance with another embodiment of the present invention.

Reference is now made to FIG. 4 wherein there is shown a detailed flowchart illustrating steps for a MAC and TCP coordination process in BS and MS in accordance with another embodiment of the present invention. Normal communication occurs between the MS and the currently serving BS (in this case BS#1). The MS then enters into the HO pre-registration phase as discussed above and a determination is made that a HO is needed. The MS then issues the MOB HO-IND message to the serving BS. To this point, operation is in accordance with the known prior art.

As shown in FIG. 4, prior to the serving BS releasing the MS, the MAC layer of the MS sends the definite HO indication message to the mobility management module and the information concerning the HO is passed on to the TCP layer of the MS (for example, in response to a TCP layer request). The TCP layer, for the TCP receiver, responds to the indication of a HO by generating a TCP ACK message for communication to the TCP sender. This TCP ACK message has its "advertised window size" set to a zero value. Upon receipt, this forces the TCP sender into a freeze state and prevents its congestion window from dropping. The TCP layer of the TCP sender then waits, in the freeze period, for the HO to be completed. When the MAC layer of the MS completes initial network entry after HO with respect to the newly serving BS (in this case BS#3), the LINK_OK notification is sent to the mobility management module. Now that reconnection at the MAC layer has been accomplished following HO, the completion of the HO is communicated in the HO information from the mobility management module to the TCP layer of the MS (again, for example, in response to a request). Responsive thereto, the TCP layer of the TCP receiver sends another TCP ACK message with the "advertised window size" set to an actual and useful communication value (i.e., a non-zero value, the previous value when communications were being performed). Upon receipt, the TCP sender will terminate the freeze so as to restore its normal state It is noted that most of the prior art solutions focus on an improvement of TCP throughput in wireless and mobile networks at the receiver side. Thus, they cannot prevent the TCP from degrading when the MS acts as a TCP sender in the duration of the HO process. The solution of the present invention targets TCP performance enhancement from the perspective that the MS can act as both the TCP sender and the TCP receiver. The MAC-TCP cross-layer coordination module (mobility manager) is introduced into the TCP/IP/MAC communications protocol stack of the MS to facilitate interaction between MAC layer HO and the TCP layer congestion control. Based on this cross-layer model, both the TCP sender entity and the TCP receiver entity can apply the best solutions to avoid a deterioration in performance associated with a HO.

An evaluation of the performance of the present solution in comparison to normal TCP is now provided.

Let RTT denote the average round trip time in a normal link condition. Assume that TCP works in a stable state before HO, and W is the window value of the TCP sender (which may be either the mobile station or the remote server).

During the temporary disconnection period caused by HO, the normal TCP layer drops its congestion window down to the minimum value (always set to 1) once it detects packet loss. Thus, after the link is reconnected at the end of the HO process, the TCP sender starts the slow-start algorithm to grow its window. It increases the window value by a factor of 2 each time it receives an ACK message. Then, after the window value reaches W/2, TCP sender enters into the congestion control phase and increases the window value by 1 each time it receives an ACK message. After completion of these two phases, the congestion window reaches the same size it was prior to the HO disconnection.

However, when applying present solution, the TCP sender's window does not drop during the disconnection period caused by HO. Thus, after the link is reconnected, the TCP sender can resume their transmission with the same window size as was present prior to the HO disconnection.

The benefits of the present solution can now be detailed. In the first RTT period after HO, there are W−1 extra packets transferred by the proposed solution than with the normal TCP. In the second RTT period, there are W−2 extra packets transferred by the proposed solution than with the normal TCP. In the third RTT time, there are W−4 extra packets transferred by the proposed solution than with the normal TCP. A similar situation continues until the slow-start procedure of normal TCP ends after the lg(W/2) round for the window to reach W/2. The sum of the extra packets transferred during this period is given by (equation 1):

$$\frac{(W-1)+(W-2)+(W-4))+(W-8)+\ldots+\left(W-\frac{W}{2}\right)}{lg\frac{W}{2}}$$

Then, the normal TCP enters into congestion control period. In the first RTT period in the congestion avoidance period, there are W/2−1 extra packets transferred by the proposed solution than with the normal TCP. In the second RTT period, there are W/2−2 extra packets transferred by the proposed solution than with the normal TCP. Then, a similar condition occurs continuously until the congestion control procedure of normal TCP ends after the W/2 round for the window to reach W. The sum of the extra packets in this period is given by (equation 2):

$$\frac{\left(\frac{W}{2}-1\right)+\left(\frac{W}{2}-2\right)+\left(\frac{W}{2}-3\right)+\left(\frac{W}{2}-4\right)+\ldots+\left(\frac{W}{2}-\frac{W}{2}\right)}{\frac{W}{2}}$$

Combining equation (1) and equation (2), the total number of extra packets transferred by the proposed solution more than with the normal TCP is (equation 3):

$$\text{Total Extra Packets} = \frac{W^2}{8} + W\left(lgW - \frac{5}{4}\right) + 1$$

Assuming the average length of a TCP packet is $l_{TCP}$ then the extra TCP throughput transferred by the proposed solution is (equation 4):

$$\text{Total Extra Throughput} = \frac{\left(\frac{W^2}{8} + W\left(lgW - \frac{5}{4}\right) + 1\right) \times l_{TCP}}{\left(\frac{W}{2} + lg\frac{W}{2}\right) \times RTT}$$

The theoretical analysis presented above shows that the new MAC and TCP coordination approach disclosed herein improves TCP throughput in the mobile and wireless environment where temporary disconnections caused by HO are frequent. This improvement is especially significant with respect to the BWA system. With this solution, the MS can resume stable transmission immediately after the HO process either as the TCP sender or as the TCP receiver. Meanwhile, the proposed solution restricts the change to only the MS side and does not require any changes on the remote correspondent TCP side or on the BS side.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A mobile device, comprising:
   a TCP sender including a communications protocol stack, said communications protocol stack including a MAC layer and a TCP layer;
   wherein said MAC layer is configured to send a first indication to the TCP layer of said communications protocol stack when the mobile device is about to engage in a communications handover from a first base station to a second base station, and is further configured to send a second indication to said TCP layer of the communications protocol stack when the mobile device has completed communications handover from the first base station to the second base station; and
   wherein said TCP layer is configured to freeze a connection and state of the TCP layer in response to receipt of the first indication from the MAC layer, and is further configured to terminate the freezing of the connection and state of the TCP layer in response to receipt of the second indication from the MAC layer.

2. The device of claim 1 wherein the mobile device further comprises a mobility manager coupled to support communication of the first and second indications between the MAC layer and the TCP layer.

3. The device of claim 2 wherein the mobility manager is coupled to support communication of the first and second indications between the MAC layer and the TCP layer bypassing an IP layer of the communications protocol stack for the TCP sender, wherein the IP layer is positioned in the communications protocol stack between the MAC layer and the TCP layer.

4. The device of claim 1 wherein said TCP layer is further configured, when freezing a connection and state of the TCP layer in response to receipt of the first indication from the MAC layer, to block an application executing on the mobile device which is sending communications using the TCP sender.

5. The device of claim 1 wherein freezing comprises freezing a round trip time timer of the TCP layer.

6. The device of claim 1 wherein the TCP layer has a certain congestion window immediately prior to freezing, has the same certain congestion window immediately after terminating and does not reduce the certain congestion window during freezing.

7. The device of claim 1 wherein the MAC layer functions to support communications handover from the first base station to the second base station and the TCP layer functions to support congestion control.

8. A mobile device, comprising:
   a TCP transceiver including a communications protocol stack, said communications protocol stack including a MAC layer and a TCP layer separated by an IP layer;
   a cross-layer coordination module coupled parallel to the communications protocol stack and coupled to both the MAC layer and the TCP layer;
   wherein said MAC layer is configured to generate an indication to the cross-layer coordination module that the mobile device is about to engage in a communications handover from a first base station to a second base station;
   wherein the cross-layer coordination module is configured to communicate handover information to the TCP layer so as to inform the TCP layer of the communications handover from the first base station to the second base station.

9. The device of claim 8, wherein the TCP transceiver is operating as a TCP sender, further comprising wherein said TCP layer is configured to respond to the communicated handover information by freezing a connection and state of the TCP layer during communications handover from the first base station to the second base station.

10. The device of claim 9 wherein said TCP layer is further configured, when freezing a connection and state of the TCP layer in response to receipt of the message, to block an application executing on the mobile device which is sending communications using the TCP sender.

11. The device of claim 9 wherein freezing comprises freezing a round trip time timer of the TCP layer.

12. The device of claim 9 wherein freezing comprises freezing a value of a congestion window for the TCP layer for a duration of the communications handover from the first base station to the second base station.

13. The device of claim 10, wherein the TCP transceiver is operating as a TCP receiver, further comprising wherein said TCP layer is configured to respond to said communicated handover information by sending a TCP acknowledge message to a TCP sender, the TCP acknowledge message having an advertised window size set to a zero value.

14. The device of claim 13, wherein the TCP transceiver is operating as a TCP sender, further comprising wherein said TCP layer is configured to respond to receipt of the TCP acknowledged message by freezing by the TCP sender of a connection and state for a duration of the communications handover from the first base station to the second base station.

15. A mobile device, comprising:
a TCP receiver including a communications protocol stack, said communications protocol stack including a MAC layer and a TCP layer;
wherein said MAC layer is configured to send a first indication to the TCP layer of the communications protocol stack when the mobile device is about to engage in a communications handover from a first base station to a second base station, and is further configured to send a second indication to said TCP layer of the communications protocol stack when the mobile device has completed communications handover from the first base station to the second base station;
wherein said TCP layer is configured send a first TCP ACK indication with an advertised window size set to a zero value to a TCP receiver in response to receipt of the first indication, and is further configured to send a second TCP ACK indication with an advertised window size set to a non-zero value to the TCP sender in response to the second indication.

16. A method, comprising:
sending a first indication from a MAC layer of a communications protocol stack for a mobile device to the TCP layer of the communications protocol stack indicating that the mobile device is about to engage in a communications handover from a first base station to a second base station;
freezing by the TCP layer of the communications protocol stack of a connection and state of the TCP layer in response to the first indication;
sending a second indication from the MAC layer of the communications protocol stack for the mobile device to the TCP layer of the communications protocol stack indicating that the mobile device has completed communications handover from the first base station to the second base station; and
terminating the freezing of the connection and state of the TCP layer in response to the second indication.

17. The method of claim 16 wherein freezing comprises blocking an application which is sending communications.

18. The method of claim 16 wherein freezing comprises freezing a round-trip time timer of the TCP layer.

19. The method of claim 16 wherein the TCP layer has a certain congestion window immediately prior to freezing, has the same certain congestion window immediately after terminating and does not reduce the certain congestion window during freezing.

20. A method, comprising:
sending a first indication from a MAC layer of a communications protocol stack for a mobile device to the TCP layer of the communications protocol stack indicating that the mobile device is about to engage in a communications handover from a first base station to a second base station;
generating, by the TCP layer of the communications protocol stack, a first TCP ACK message with an advertised window size set to a zero value in response to the first indication;
transmitting said first TCP ACK message to a TCP sender;
sending a second indication from the MAC layer of the communications protocol stack for the mobile device to the TCP layer of the communications protocol stack indicating that the mobile device has completed communications handover from the first base station to the second base station;
generating, by the TCP layer of the communications protocol stack, a second TCP ACK message with an advertised window size set to a non-zero value in response to the second indication;
and transmitting said second TCP ACK message to TCP sender.

21. The method of claim 20, further comprising:
receiving the first TCP ACK message by a TCP sender;
freezing by the TCP sender of a connection and state in response to the first TCP ACK message;
receiving the second TCP ACK message by the TCP sender; and
terminating the freezing of the connection and state by the TCP sender in response to the second TCP ACK message.

22. The method of claim 21 wherein freezing comprises blocking an application of the TCP sender which is sending communications.

23. The method of claim 21 wherein freezing comprises freezing a round-trip time timer of a TCP connection of the TCP sender.

24. The method of claim 21 wherein the TCP layer of the TCP sender has a certain congestion window immediately prior to freezing, has the same certain congestion window immediately after terminating and does not reduce the certain congestion window during freezing.

25. A method for use in a mobile device having a communications protocol stack including a MAC layer and a TCP layer separated by an IP layer, comprising:
generating an indication from the MAC layer indicating that the mobile device is about to engage in a communications handover from a first base station to a second base station;
receiving the indication by a cross-layer coordination module parallel to the communications protocol stack and coupled to both the MAC layer and TCP layer; and
communicating handover information from the cross-layer coordination module to the TCP layer so as to inform the TCP layer of the communications handover from the first base station to the second base station.

26. The method of claim 25 further comprising responding by the TCP layer to the communicated handover information, if the mobile device is operating as a TCP sender, by freezing a connection and state of the TCP layer during communications handover from the first base station to the second base station.

27. The method of claim 26 wherein freezing comprises blocking an application which is sending communications.

28. The method of claim 26 wherein freezing comprises freezing a round-trip time timer of the TCP layer.

29. The method of claim 26 wherein freezing comprises freezing a value of a congestion window for the TCP layer for the duration of the communications handover from the first base station to the second base station.

30. The method of claim 25 further comprising responding by the TCP layer to the communicated handover information, if the mobile device is operating as a TCP receiver, by sending a TCP ACK message to a TCP sender, the TCP ACK message having an advertised window size set to a zero value.

31. The method of claim 30 further comprising:
receiving the TCP ACK message by the TCP sender; and
freezing by the TCP sender of a connection and state in response to the TCP ACK message for the duration of the communications handover from the first base station to the second base station.

32. The method of claim 25 wherein communicating comprises communicating handover information from the cross-layer coordination module to the TCP layer in response to an inquiry issued by the TCP layer to the cross-layer coordination module.

\* \* \* \* \*